Jan. 27, 1925.

L. F. MOREHEAD

LOOSE LUG LOCK NUT

Filed Aug. 20, 1923

1,524,099

INVENTOR
LUTHER F. MOREHEAD,
By: Otto H. Rueger,
his Atty.

Patented Jan. 27, 1925.

1,524,099

UNITED STATES PATENT OFFICE.

LUTHER F. MOREHEAD, OF LONG BEACH, CALIFORNIA.

LOOSE-LUG LOCK NUT.

Application filed August 20, 1923. Serial No. 658,383.

*To all whom it may concern:*

Be it known that I, LUTHER F. MOREHEAD, a citizen of the United States, residing at Long Beach, in the county of Los Angeles and State of California, have invented a new and useful Loose-Lug Lock Nut, of which the following is a specification.

This invention relates to devices for securely locking a nut to a bolt.

One of the objects of this invention is to provide a device by which the second nut has no direct bearing on the bolt.

Another object is to provide a device in which nuts are loosely interengaged by threaded portions, having loosely interposed lugs to wedge between one of the nuts and the commonly engaged bolt.

Other objects will appear from the following description and appended claims as well as from the accompanying drawing, in which—

It is commonly desirable to lock a nut to a bolt so as not to loosen or become loose by vibration, though the nut should easily be removable when necessary.

The interlocking of a nut and bolt must, on the other hand, not affect the durability of, either, the nut or the bolt. In other words, an interlocking must be effected, and the releasing or loosening must be possible without defacing or damaging or impairing the usefulness of, either, the nut or bolt.

With a device, designed according to this invention, a nut is locked or secured to a bolt by means of loosely disposed lugs between the first-named nut and another nut. The second nut never bears directly on the bolt, and the lugs are not intended to shift or engage in a screwing movement in relation to the bolt in, either, the locking or releasing action, thereby eliminating a tearing or stripping of threads during the releasing or loosening action of the nut from the bolt.

Figure 1:
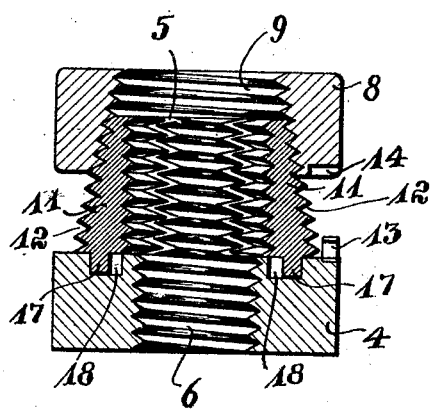
Fig. 1 is longitudinal section through two nuts and interposed lugs of a design to illustrate the invention.
Figure 2:
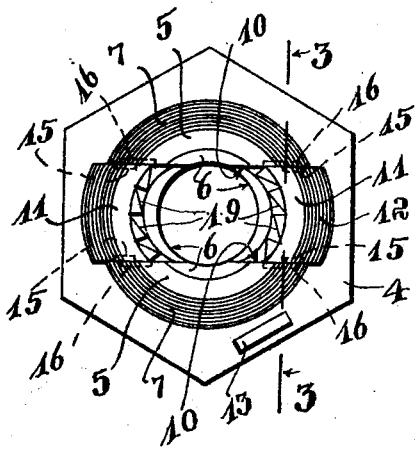
Fig. 2 is a top plan view of one of the nuts and the two inserted lugs of the device in Fig. 1.

The nut 4, illustrated in Figs. 1 and 2, is provided with an extension end 5, the whole being provided with inside threads, as indicated at 6, to fit on a bolt, not shown in the drawing. The outside of the extension end 5 is preferably of taper or conical shape, and also threaded, as indicated at 7 in Fig. 2. A second nut 8 is threaded as indicated at 9 in Fig. 1, to fit on the threaded extension end 5 without materially affecting the extension end. The extension end 5 is split in a crosswise manner as indicated at 10 in Fig. 2. The lugs 11 are loosely disposed within the bifurcation of the split extension end 5, to be shiftable in radial direction. The inner faces of the lugs are provided with threads similar to the threads within the nut 4 and extension end 5. The outer faces of the lugs are provided with threads similar to the taper threads on the outside of the extension end 5, as indicated at 12.

While it is desirable that the nut 4 with extension end 5 should easily move on the threads of a bolt, unaffected by the action of the second nut 8, as stated above, it is preferred that the lugs are designed of suitably heavier material than the extension end 5, so that the lugs can be caused to firmly engage with an inserted bolt when the nut 8 is tightened on the extension end 5 and on the lugs 11. The binding or wedging effect between the nut 8, the lugs 11, and an inserted bolt tends to act in this structure in the manner of a key on a shaft. The nut 4 is prevented from turning by means of the bifurcated extension end 5 engaging with such a key on a bolt. Neither, the nuts, nor the lugs are tightened to the bolt by a screwing action, and therefore cannot deface, damage, or in any manner impair the durability or usefulness of any part of this device.

The structure set forth above is fully sufficient to assure a secure interlocking of the nuts with an inserted bolt, but additional safety means are illustrated in the drawing. A spring 13, indicated in Figs. 1 and 2, is designed to engage with a recess 14 in the nut 8 when the two nuts 4 and 8 approach each other in the tightening action. The nuts and the threads of the different parts are, of course, designed so that the two nuts do not come so close together that the spring 13 could not be disengaged from the recess 14 when the nuts are to be released. To avoid or prevent a falling apart of the nut 4 and the lugs 11, light springs are inserted as indicated at 15 in Figs. 2 and 3, to engage with recesses 16, when the lugs are within the bifurcations of the extension end 5 of the nut 4. The springs 15 are light enough to easily allow a removing of the lugs 11 from the nut 4 when necessary or desired, while sufficiently strong enough to retain the lugs within proper position in relation to the nut 4 during the normal handling of this device. Extension-ends 17 serve to locate the lugs within the proper positions in relation to the nut 4. In Fig. 2, the inner threads of the lugs 11 are illustrated with teeth-like cut-outs, but this too is not absolutely necessary since the lugs may be so well wedged against an inserted bolt, by providing a suitable taper shape for the outer threads of the lugs 11 and extension ends 5, that an accidental loosening is practically impossible.

The nut 8 of this device can always easily be removed and applied, making the whole structure very efficient for repeated use.

Figure 3:
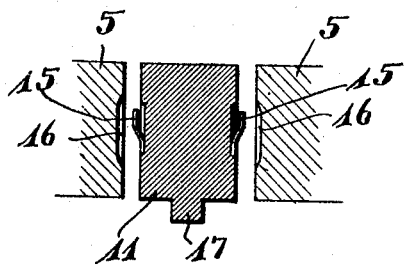
Fig. 3 is a section on line 3—3 of Fig. 2.

The lug 11 is illustrated spaced between the two branches of the extension end 5 in Fig. 3, merely to more clearly show the arrangement of the springs 15 between the lugs and nut 4.

Having thus described my invention, I claim:

1. In a lock-nut, a nut having an outwardly threaded extension end and having a threaded bore extending through the nut and through the extension end, the extension end being bifurcated, lugs having threads to align with the inner and outer threads of the extension end shiftably disposed in the bifurcations of the extension end, and a second nut disposed over the outside of the extension end and the lugs.

2. In a lock-nut structure, a nut having a bifurcation transversely to its bore and being threaded on the inside and outside and having furthermore recesses in the end face within the bifurcation.

3. In a lock-nut structure, a lug having a segmental threaded face adapted to engage over a bolt and having another segmental threaded face on the opposite side adapted to be engaged by a nut, the lug having a reduced extension end projecting from one of its end faces.

4. In a lock-nut structure, a nut having an outwardly threaded extension end and having a threaded bore extending through the nut and through the extension end, the extension end being bifurcated, lugs movably disposed in the bifurcations and having threads to align with the inner and outer threads of the nut, a second nut disposed over the outside of the lugs and first-named nut, and means for removably holding the lugs within the bifurcations.

5. In a lock-nut structure, a nut having inner and outer threads and having a bifurcation transversely to the threaded faces, lugs having threads to align with the inner and outer threads of the nut movably disposed in the bifurcation of the nut, a second nut disposed over the outside of the first-named nut and the lugs, and means between the two nuts to resist a turning of one nut in relation to the other.

6. In a lock-nut structure, a nut having inner and outer threads and having a bifurcation transversely to the threaded faces, lugs movably disposed in the bifurcation of the nut, a second nut disposed over the outside of the first-named nut and the lugs, springs disposed between the lugs and the first-named nut for maintaining the lugs in nearly operative positions, and anti-slipping means between the two nuts.

In testimony that I claim the foregoing as my invention I have signed my name in the presence of two subscribing witnesses.

LUTHER F. MOREHEAD.

Witnesses:
O. H. KINEGER,
E. HATTENBACH.